(12) United States Patent
Hayama et al.

(10) Patent No.: US 11,873,805 B2
(45) Date of Patent: Jan. 16, 2024

(54) CAPACITY CONTROL VALVE

(71) Applicant: EAGLE INDUSTRY CO., LTD., Tokyo (JP)

(72) Inventors: Masahiro Hayama, Tokyo (JP); Kohei Fukudome, Tokyo (JP); Takahiro Ejima, Tokyo (JP); Daichi Kurihara, Tokyo (JP); Wataru Takahashi, Tokyo (JP); Keigo Shirafuji, Tokyo (JP)

(73) Assignee: EAGLE INDUSTRY CO., LTD.

( * ) Notice: Subject to any disclaimer, the term of this patent is extended or adjusted under 35 U.S.C. 154(b) by 482 days.

(21) Appl. No.: 17/258,692

(22) PCT Filed: Aug. 7, 2019

(86) PCT No.: PCT/JP2019/031067
§ 371 (c)(1),
(2) Date: Jan. 7, 2021

(87) PCT Pub. No.: WO2020/032087
PCT Pub. Date: Feb. 13, 2020

(65) Prior Publication Data
US 2021/0285433 A1  Sep. 16, 2021

(30) Foreign Application Priority Data
Aug. 8, 2018  (JP) ................. 2018-149803

(51) Int. Cl.
*F04B 27/18* (2006.01)
*F16K 11/10* (2006.01)

(52) U.S. Cl.
CPC .......... *F04B 27/1804* (2013.01); *F16K 11/10* (2013.01); *F04B 2027/1809* (2013.01)

(58) Field of Classification Search
CPC .............. F04B 27/1804; F04B 27/0895; F04B 27/1009; F04B 27/16; F04B 27/18; F04B 49/22; F04B 2201/106; F04B 2027/1809; F04B 2027/1813; F04B 2027/1827; F04B 2027/1831; F04B 2027/1822; F04B 2027/1881; F04B 2027/1877;
(Continued)

(56) References Cited

U.S. PATENT DOCUMENTS 2,617,621 A   11/1952  James ...................... F16K 41/10
3,787,023 A   1/1974   Shufflebarger .......... F16K 41/10
(Continued)

FOREIGN PATENT DOCUMENTS

EP   1081378   3/2001   ............... F04B 27/18
EP   2594794   5/2013   ............... F04B 27/18
(Continued)

OTHER PUBLICATIONS

U.S. Appl. No. 17/259,138, filed Jan. 8, 2021, Hayama et al.
(Continued)

*Primary Examiner* — Kelsey E Cary
(74) *Attorney, Agent, or Firm* — HAYES SOLOWAY P.C.

(57) ABSTRACT

A capacity control valve includes a valve housing formed with a discharge port, a suction port, and first and second control ports, a rod driven by a solenoid, a CS valve configured to control a fluid flow between the first control port and the suction port in accordance with a movement of the rod, and a DC valve configured to control a fluid flow between the second control port and the discharge port in accordance with a movement of the rod.

20 Claims, 8 Drawing Sheets

(58) Field of Classification Search
CPC ...... F04B 2027/1868; F04B 2027/1859; F04B 2027/1854; F04B 2027/1845; F16K 11/10; F16K 11/0716; F16K 31/0163
See application file for complete search history.

(56) References Cited

U.S. PATENT DOCUMENTS

| | | | |
|---|---|---|---|
| 4,166,607 A | 9/1979 | Webb | F16K 1/10 |
| 6,010,312 A | 1/2000 | Suitou et al. | F04B 1/26 |
| 6,062,823 A | 5/2000 | Kawaguchi | F04B 27/1804 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,485,267 B1 | 11/2002 | Imai et al. | F04B 1/26 |
| 6,772,990 B2 | 8/2004 | Sasaki | F16K 31/0627 |
| 8,021,124 B2 | 9/2011 | Umemura et al. | 417/222.2 |
| 8,079,827 B2 | 12/2011 | Iwa et al. | 417/222.2 |
| 8,757,988 B2 | 6/2014 | Fukudome | F04B 27/1804 |
| 9,132,714 B2 | 9/2015 | Futakuchi | B60H 1/00485 |
| 9,523,987 B2 | 12/2016 | Fukudome | G05D 7/0106 |
| 9,568,108 B2 | 2/2017 | Takahashi | F16J 15/3496 |
| 9,732,874 B2 | 8/2017 | Saeki | F04B 27/1804 |
| 9,777,863 B2 | 10/2017 | Higashidozono | F04B 27/1804 |
| 9,964,102 B2 | 5/2018 | Kondo | F04B 27/1045 |
| 10,697,548 B2 | 6/2020 | Iguchi | F16J 15/34 |
| 10,781,804 B2 | 9/2020 | Higashidozono et al. | F04B 27/18 |
| 10,883,606 B2 | 1/2021 | Takigahria | F16J 15/3452 |
| 11,053,933 B2 | 7/2021 | Warren | F04B 27/1804 |
| 11,085,431 B2 | 8/2021 | Fukudome | F04B 27/18 |
| 11,156,301 B2 | 11/2021 | Hayama | F16K 31/0627 |
| 11,326,585 B2 | 5/2022 | Hayama et al. | F04B 27/1009 |
| 11,359,624 B2 | 6/2022 | Kurihara et al. | F04B 49/12 |
| 2004/0060604 A1 | 4/2004 | Uemura et al. | 137/595 |
| 2005/0035321 A1 | 2/2005 | Uemura | F16K 27/041 |
| 2005/0287014 A1 | 12/2005 | Umemura | F04B 27/1804 |
| 2006/0218953 A1 | 10/2006 | Hirota | 62/228.5 |
| 2007/0214814 A1 | 9/2007 | Umemura et al. | 62/228.1 |
| 2008/0138213 A1 | 6/2008 | Umemura | F04B 27/1804 |
| 2009/0108221 A1 | 4/2009 | Umemura | F04B 27/1804 |
| 2009/0183786 A1 | 7/2009 | Iwa et al. | 137/487.5 |
| 2012/0198992 A1 | 8/2012 | Futakuchi et al. | 91/505 |
| 2012/0198993 A1 | 8/2012 | Fukudome et al. | F04B 27/18 |
| 2013/0126017 A1 | 5/2013 | Ota et al. | F04B 27/1804 |
| 2014/0130916 A1 | 5/2014 | Saeki | F04B 27/1804 |
| 2015/0004010 A1 | 1/2015 | Saeki | F04B 27/1804 |
| 2015/0010410 A1 | 1/2015 | Saeki et al. | F04B 49/225 |
| 2015/0068628 A1 | 3/2015 | Iwa et al. | F16K 31/06 |
| 2015/0211506 A1 | 7/2015 | Shirafuji et al. | F04B 27/1804 |
| 2015/0345655 A1 | 12/2015 | Higashidozono et al. | F16K 31/0624 |
| 2016/0290326 A1 | 10/2016 | Sugamura | F04B 27/1804 |
| 2017/0175726 A1 | 6/2017 | Kume | F04B 27/1804 |
| 2017/0028462 A1 | 10/2017 | Hayama et al. | F16K 47/06 |
| 2017/0284562 A1 | 10/2017 | Hayama et al. | F16K 47/06 |
| 2017/0356430 A1 | 12/2017 | Irie et al. | F04B 27/1804 |
| 2018/0291888 A1 | 10/2018 | Tonegawa | F16K 31/0624 |
| 2020/0362974 A1 | 11/2020 | Hayama | F04B 49/22 |
| 2021/0285433 A1 | 9/2021 | Hayama | F04B 27/1804 |
| 2022/0034414 A1 | 2/2022 | Ito | F04B 27/18 |

FOREIGN PATENT DOCUMENTS

| | | | |
|---|---|---|---|
| EP | 2 784 320 | 10/2014 | F04B 27/18 |
| EP | 3 431 760 | 1/2019 | F04B 27/18 |
| JP | 5-306679 | 11/1993 | F04B 27/08 |
| JP | 6-200875 | 7/1994 | F04B 27/08 |
| JP | 7-27049 | 1/1995 | F04B 27/10 |
| JP | 9-144929 | 6/1997 | F16K 31/06 |
| JP | 10-148258 | 6/1998 | F16J 3/04 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2003-42062 | 2/2003 | F04B 27/14 |
| JP | 2006-52648 | 2/2006 | F04B 27/14 |
| JP | 2006-307828 | 11/2006 | F04B 27/14 |
| JP | 2007-247512 | 9/2007 | F04B 27/14 |
| JP | 2008-14269 | 1/2008 | F04B 27/14 |
| JP | 2008-202572 | 9/2008 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 5167121 | 12/2012 | F04B 27/14 |
| JP | 2014-118939 | 6/2014 | F04B 27/14 |
| JP | 5557901 | 6/2014 | F04B 27/14 |
| JP | 2014-190247 | 10/2014 | F04B 27/14 |
| JP | 2016-196876 | 11/2016 | F04B 27/18 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-21646 | 2/2018 | F16K 31/06 |
| JP | 2018-40385 | 3/2018 | F16K 31/06 |
| JP | 2018-145877 | 9/2018 | F04B 39/14 |
| JP | 2019-2384 | 1/2019 | F04B 27/18 |
| WO | WO 2007/119380 | 10/2007 | F04B 27/14 |
| WO | WO2011021789 | 2/2011 | F04B 27/14 |
| WO | WO2011135911 | 11/2011 | F04B 27/14 |
| WO | WO2013109005 | 7/2013 | F04B 49/06 |
| WO | WO2013176012 | 11/2013 | F04B 27/14 |
| WO | WO 2014/091975 | 6/2014 | F04B 27/14 |
| WO | WO 2014/119594 | 8/2014 | F04B 27/14 |
| WO | WO2016104390 | 6/2016 | F16K 31/06 |
| WO | WO 2017/057160 | 4/2017 | F04B 27/18 |
| WO | WO 2017/159553 | 9/2017 | F04B 27/18 |
| WO | WO2018207461 | 11/2018 | F04B 27/18 |
| WO | WO2019167912 | 9/2019 | F04B 27/18 |

OTHER PUBLICATIONS

U.S. Appl. No. 17/258,708, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/969,175, filed Aug. 11, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/007187, dated Apr. 23, 2019, with English translation, 16 pages.
International Preliminary Report on Patentability issued in PCT/JP2019/007187, dated Sep. 3, 2020, 8 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.

(56) References Cited

OTHER PUBLICATIONS

International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/031067, dated Feb. 9, 2021, 6 pages.
International Search Report and Written Opinion issued in PCT/JP2019/031068, dated Oct. 15, 2019, with English translation, 13 pages.
International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
International Search Report and Written Opinion issued in PCT/JP2021/015598, dated Jun. 15, 2021, with English translation, 13 pages.
International Preliminary Report on Patentability issued in PCT/JP2020/015598, dated Oct. 25, 2022, 5 pages.
Chinese Official Action issued in related application serial No. 202080026878.6, dated Oct. 9, 2022, with translation, 9 pages.
Chinese Official Action issued in related application serial No. 201980046750.3, dated Nov. 3, 2022, with translation, 11 pages.
European Official Action issued in related application serial No. 20744724.4, dated Sep. 16, 2022, 8 pages.
European Official Action issued in related application serial No. 20765478.1, dated Nov. 3, 2022, 7 pages.
European Official Action issued in related application serial No. 20783639.6, dated Nov. 22, 2022, 8 pages.
U.S. Official Action issued in related U.S. Appl. No. 17/299,285, dated Mar. 31, 2022, 11 pages.
Chinese Official Action issued in related application serial No. 201980044409.4, dated Jan. 26, 2022, with translation, 10 pages.
Chinese Official Action issued in related application serial No. 201980044138.2, dated Mar. 30, 2022, with translation, 9 pages.
Chinese Official Action issued in related application serial No. 201980044077.x, dated Apr. 2, 2022, with translation, 11 pages.
Chinese Official Action issued in related application serial No. 201980046798.4, dated Apr. 6, 2022, with translation, 8 pages.
Chinese Official Action issued in related application serial No. 201980046750.3, dated Apr. 27, 2022, with translation, 10 pages.
Chinese Official Action issued in related application serial No. 201980047614.6, dated Apr. 26, 2022, with translation, 9 pages.
European Search Report issued in related application serial No. 19848099.8, dated Feb. 9, 2022, 7 pages.
European Search Report issued in related application serial No. 19834984.7, dated Feb. 21, 2022, 12 pages.
European Search Report issued in related application serial No. 19833331.2, dated Mar. 30, 2022, 6 pages.
European Search Report issued in related application serial No. 19847690.5, dated Feb. 9, 2022, 5 pages.
European Search Report issued in related application serial No. 19847395.1, dated Feb. 9, 2022, 5 pages.
European Search Report issued in related application serial No. 19834556.3, dated Feb. 17, 2022, 7 pages.
European Search Report issued in related application serial No. 19833028.4, dated Apr. 7, 2022, 8 pages.
European Search Report issued in related application serial No. 19894059.5, dated Jun. 7, 2022, 4 pages.
European Search Report issued in related application serial No. 19883193.5, dated May 23, 2022, 5 pages.
U.S. Official Action issued in related U.S. Appl. No. 17/256,953, dated Apr. 15, 2022, 18 pages.
U.S. Official Action issued in related U.S. Appl. No. 17/259,138, dated Mar. 31, 2022, 5 pages.
U.S. Official Action issued in related U.S. Appl. No. 17/256,955, dated Feb. 18, 2022, 19 pages.
U.S. Official Action issued in related U.S. Appl. No. 17/259,138, dated Jan. 19, 2022, 6 pages.
U.S. Official Action issued in related U.S. Appl. No. 17/256,959, dated May 5, 2022, 18 pages.
U.S. Official Action issued in related U.S. Appl. No. 17/433,558, dated May 25, 2022, 11 pages.
International Search Report and Written Opinion issued in PCT/JP2019/043374, dated Jan. 7, 2020, with English translation, 10 pages.
International Preliminary Report on Patentability issued in PCT/JP2019/043374, dated May 11, 2021, 4 pages.
International Search Report and Written Opinion issued in PCT/JP2019/047192, dated Jun. 11, 2020, with English translation, 15 pages.
International Preliminary Report on Patentability issued in PCT/JP2019/047192, dated Jun. 8, 2021, 4 pages.
International Search Report and Written Opinion issued in PCT/JP2020/001443, dated Mar. 31, 2020, with English translation, 15 pages.
International Preliminary Report on Patentability issued in PCT/JP2020/001443, dated Jul. 29, 2021, 8 pages.
International Search Report and Written Opinion issued in PCT/JP2020/007953, dated Apr. 7, 2020, with English translation, 17 pages.
International Preliminary Report on Patentability issued in PCT/JP2020/007953, dated Sep. 16, 2021, 10 pages.
International Search Report and Written Opinion issued in PCT/JP2020/015181, dated Jun. 16, 2020, with English translation, 11 pages.
International Preliminary Report on Patentability issued in PCT/JP2020/015181, dated Oct. 14, 2021, 5 pages.
International Search Report and Written Opinion issued in PCT/JP2020/015175, dated Jun. 23, 2020, with English translation, 13 pages.
International Preliminary Report on Patentability issued in PCT/JP2020/015175, dated Oct. 14, 2021, 6 pages.
U.S. Official Action issued in related U.S. Appl. No. 17/259,138, dated Jan. 18, 2022, 14 pages.
Notice of Allowance issued in related U.S. Appl. No. 17/287,086, dated Feb. 2, 2022, 7 pages.
Chinese Official Action issued in related application serial No. 202080016397.7, dated Aug. 3, 2022, with translation, 10 pages.
Chinese Official Action issued in related application serial No. 202080007416.X, dated Jul. 28, 2022, with translation, 9 pages.
European Official Action issued in related application serial No. 20782597.7, dated Oct. 19, 2022, 5 pages.
U.S. Official Action issued in related U.S. Appl. No. 17/256,955, dated Aug. 23, 2022, 17 pages.
U.S. Notice of Allowance issued in related U.S. Appl. No. 17/256,959, dated Sep. 7, 2022, 13 pages.
www.lexico.com/en/definition/connected accessed Aug. 15, 2022, Year 2022.
U.S. Appl. No. 17/256,953, filed Dec. 29, 2020.
U.S. Appl. No. 17/299,285, filed Jun. 2, 2021.
U.S. Appl. No. 17/256,959, filed Dec. 29, 2020.
U.S. Appl. No. 17/287,086, filed Apr. 20, 2021.
U.S. Appl. No. 17/417,701, filed Jun. 23, 2021.

(56) References Cited

OTHER PUBLICATIONS

U.S. Appl. No. 17/258,692, filed Jan. 7, 2021.
U.S. Appl. No. 17/256,955, filed Dec. 29, 2020.
U.S. Appl. No. 17/433,558, filed Aug. 24, 2021.
U.S. Appl. No. 17/256,947, filed Dec. 29, 2020.
U.S. Appl. No. 17/258,708, filed Jan. 7, 2021.
U.S. Appl. No. 17/259,138, filed Jan. 8, 2021.
U.S. Appl. No. 17/600,547, filed Sep. 30, 2021.
U.S. Appl. No. 17/599,539, filed Sep. 28, 2021.
U.S. Official Action issued in related U.S. Appl. No. 17/417,701, dated Aug. 2, 2023, 11 pages.
U.S. Official Action issued in related U.S. Appl. No. 17/600,547, dated Sep. 13, 2023, 13 pages.
Notice of Allowance issued in related U.S. Appl. No. 17/599,539, dated Jul. 25, 2023, 4 pages.

| ENERGIZATION STATE | CURRENT | CS VALVE | DC VALVE |
|---|---|---|---|
| NON-ENERGIZATION | 0 | CLOSED | OPENED |
| ENERGIZATION | 0 ~ MAX | OPENING DEGREE INCREASED | CONTINUOUSLY CLOSED AFTER OPENING DEGREE DECREASE |
| | MAX | OPENED | CLOSED |

Fig. 7

CAPACITY CONTROL VALVE

TECHNICAL FIELD

The present invention relates to a capacity control valve configured to variably control a working fluid capacity, and for example, relates to a capacity control valve configured to control, according to a pressure, a discharge amount of a variable displacement compressor used for an air-conditioning system of an automobile.

BACKGROUND ART

A variable displacement compressor used for, e.g., an air-conditioning system of an automobile includes, for example, a rotary shaft to be rotatably driven by an engine, a swash plate coupled such that an inclination angle thereof with respect to the rotary shaft is variable, and a compression piston coupled to the swash plate. The inclination angle of the swash plate is changed, and accordingly, a stroke amount of the piston is changed. In this manner, a fluid discharge amount is controlled. Using a capacity control valve to be openably driven by electromagnetic force, the variable displacement compressor can control the internal pressure of a control chamber as necessary to continuously change the inclination angle of the swash plate while utilizing a suction pressure Ps of a suction chamber for sucking fluid, a discharge pressure Pd of a discharge chamber for discharging fluid pressurized by the piston, and a control pressure Pc of the control chamber housing the swash plate (see Patent Citations 1, 2 and 3).

In continuous drive of the variable displacement compressor (hereinafter sometimes merely referred to as "in continuous drive"), energization of the capacity control valve is controlled by a control computer, and the capacity control valve moves a valve body in an axial direction by electromagnetic force generated by a solenoid to perform the normal control of opening/closing a main valve to adjust the control pressure Pc of the control chamber of the variable displacement compressor.

For example, a capacity control valve of Patent Citation 1 is configured such that a control chamber is connected to a discharge chamber through a stationary orifice, and controls a CS valve as a main valve to adjust the pressure of the control chamber with a suction pressure. Moreover, a capacity control valve of Patent Citation 2 is configured such that a control chamber is connected to a suction chamber through a stationary orifice, and controls a DC valve as a main valve to adjust the pressure of the control chamber with a discharge pressure. Further, a capacity control valve of Patent Citation 3 controls a CS valve and a DC valve to adjust the pressure of a control chamber.

In normal control of the capacity control valve, the pressure of the control chamber in the variable displacement compressor is controlled as necessary, and the inclination angle of the swash plate with respect to the rotary shaft is continuously changed. In this manner, the stroke amount of the piston is changed such that the fluid discharge amount of the discharge chamber is controlled, and the air-conditioning system is adjusted to have a desired cooling capacity. Moreover, in a case where the variable displacement compressor is driven with the maximum capacity, the main valve of the capacity control valve is closed such that the pressure of the control chamber decreases, and in this manner, the inclination angle of the swash plate becomes maximum.

CITATION LIST

Patent Literature

Patent Citation 1: JP 2017-129042 A (Page 9, FIG. 2)
Patent Citation 2: Japanese Patent No. 6206274 (Page 8, FIG. 2)
Patent Citation 3: Japanese Patent No. 4242624 (Page 7, FIG. 1)

SUMMARY OF INVENTION

Technical Problem

However, in Patent Citations 1 and 2, the capacity control valve can be configured with a simple configuration. However, the stationary orifice connected to the control chamber of the variable displacement compressor has a constant flow path sectional area. Thus, for adjusting the pressure of the control chamber only by control of the main valve (i.e., the CS valve or the DC valve) in normal control, there is room for improvement in controllability of the control pressure Pc. Moreover, in Patent Citation 3, the CS valve and the DC valve are arranged to enhance controllability. However, Patent Citation 3 fails to describe cooperation of the CS valve and the DC valve, and a favorable control efficiency in normal control cannot be always provided.

The present invention has been made in view of these problems, and is intended to provide a capacity control valve with a favorable control efficiency in normal control.

Solution to Problem

For solving the above-described problems, a capacity control valve according to the present invention is a capacity control valve for controlling a flow rate by energization of a solenoid, the capacity control valve including: a valve housing formed with a discharge port through which discharge fluid with a discharge pressure passes, a suction port through which suction fluid with a suction pressure passes, and first and second control ports through which control fluid with a control pressure passes; a rod arranged in the valve housing and driven by the solenoid; a CS valve configured to control a fluid flow between the first control port and the suction port in accordance with a movement of the rod; and a DC valve configured to control a fluid flow between the second control port and the discharge port in accordance with a movement of the rod. In a non-energization state of the solenoid, the CS valve is closed and the DC valve is opened. In a maximum current state of the solenoid, the CS valve is opened and the DC valve is closed. In energization control of the solenoid, the CS valve transitions from a closed state to an open state and the DC valve transitions from an open state to a closed state, and the DC valve is closed with a stroke of equal to or longer than a predetermined stroke shorter than the maximum stroke of the rod. According to the aforesaid feature, the flow rate is controlled by cooperation of the CS valve and the DC valve, and therefore, the control pressure can be controlled with a favorable efficiency. Moreover, the degree of opening transitions in opposite directions between the CS valve and the DC valve as energization current increases, and therefore, the control pressure can be quickly controlled. Further, a control area corresponding to the energization current for the solenoid is broader in the CS valve than in the DC valve. While the CS valve is transitioning from the closed state to the open state, the DC valve is opened when the stroke of the rod is equal to or shorter than the predetermined stroke, and is closed when the stroke is equal to or longer than the predetermined stroke. That is, the CS valve is main and the DC valve is auxiliary, and therefore, a favorable control efficiency in normal control of the capacity control valve is provided.

It may be preferable that the DC valve includes a DC valve body slidably attached to the rod and a DC valve seat formed in the valve housing. According to this configuration, the DC valve can be simply configured.

It may be preferable that the DC valve body is biased toward a side of the DC valve seat by a spring. According to this configuration, the closed state can be reliably held when the DC valve is closed.

It may be preferable that a flange portion extending in a radially outward direction and configured to restrict movement of the DC valve body in a closing direction of the DC valve is provided in the rod. According to this configuration, the DC valve body moves in an opening direction in association with movement of the rod in an opening direction, and therefore, the DC valve can be reliably held in the open state in a non-energization state of the rod.

It may be preferable that the flange portion is formed by a ring which is a body different from a rod body. According to this configuration, the flange portion can be simply configured.

It may be preferable that the DC valve body is arranged between the outer periphery of the rod and the inner periphery of the housing so as to partition the suction port and the discharge port. According to this configuration, the capacity control valve can be simply configured.

It may be preferable that the CS valve includes a pressure-sensitive body arranged in a pressure-sensitive chamber formed with the first control port and configured to bias the rod and a CS valve seat of the CS valve, the CS valve seat being formed in the valve housing. According to this configuration, a structure in which reactive force provided to the rod according to the suction pressure is increased/decreased is made, and controllability of the control pressure is enhanced.

It may be preferable that the second control port, the discharge port, the suction port, and the first control port may be arranged in a description order from a side of the solenoid. According to this configuration, the valve housing can be simply configured.

For solving the above-described problems, another capacity control valve according to the present invention is a capacity control valve for controlling a flow rate by energization of a solenoid, including: a valve housing formed with a discharge port through which discharge fluid with a discharge pressure passes, a suction port through which suction fluid with a suction pressure passes, and first and second control ports through which control fluid with a control pressure passes; a rod arranged in the valve housing and driven by the solenoid; a DC valve body forming a DC valve arranged at the outer periphery of the rod to control a fluid flow between the second control port and the discharge port; and a pressure-sensitive body forming a CS valve configured to control a fluid flow between the first control port and the suction port in accordance with a movement of the rod. According to the aforementioned feature, the flow rate is controlled by cooperation of the CS valve and the DC valve, and therefore, the control pressure can be controlled with a favorable efficiency.

BRIEF DESCRIPTION OF DRAWINGS

FIG. 7 is a table for describing the energization state of the capacity control valve according to the embodiment and the opened/closed states of the CS valve and the DC valve.

DESCRIPTION OF EMBODIMENTS

Hereinafter, a mode for carrying out a capacity control valve according to the present invention will be described based on an embodiment.

Embodiment

A capacity control valve according to an embodiment of the present invention will be described with reference to FIGS. 1 to 7. Hereinafter, right and left sides as viewed from a front side of FIG. 2 will be described as right and left sides of the capacity control valve.

The capacity control valve V of the present invention is incorporated into a variable displacement compressor M used for, e.g., an air-conditioning system of an automobile. The capacity control valve V variably controls the pressure of working fluid (hereinafter merely referred to as "fluid") as refrigerant, thereby controlling a discharge amount of the variable displacement compressor M and adjusting the air-conditioning system to have a desired cooling capacity.

Figure 1:
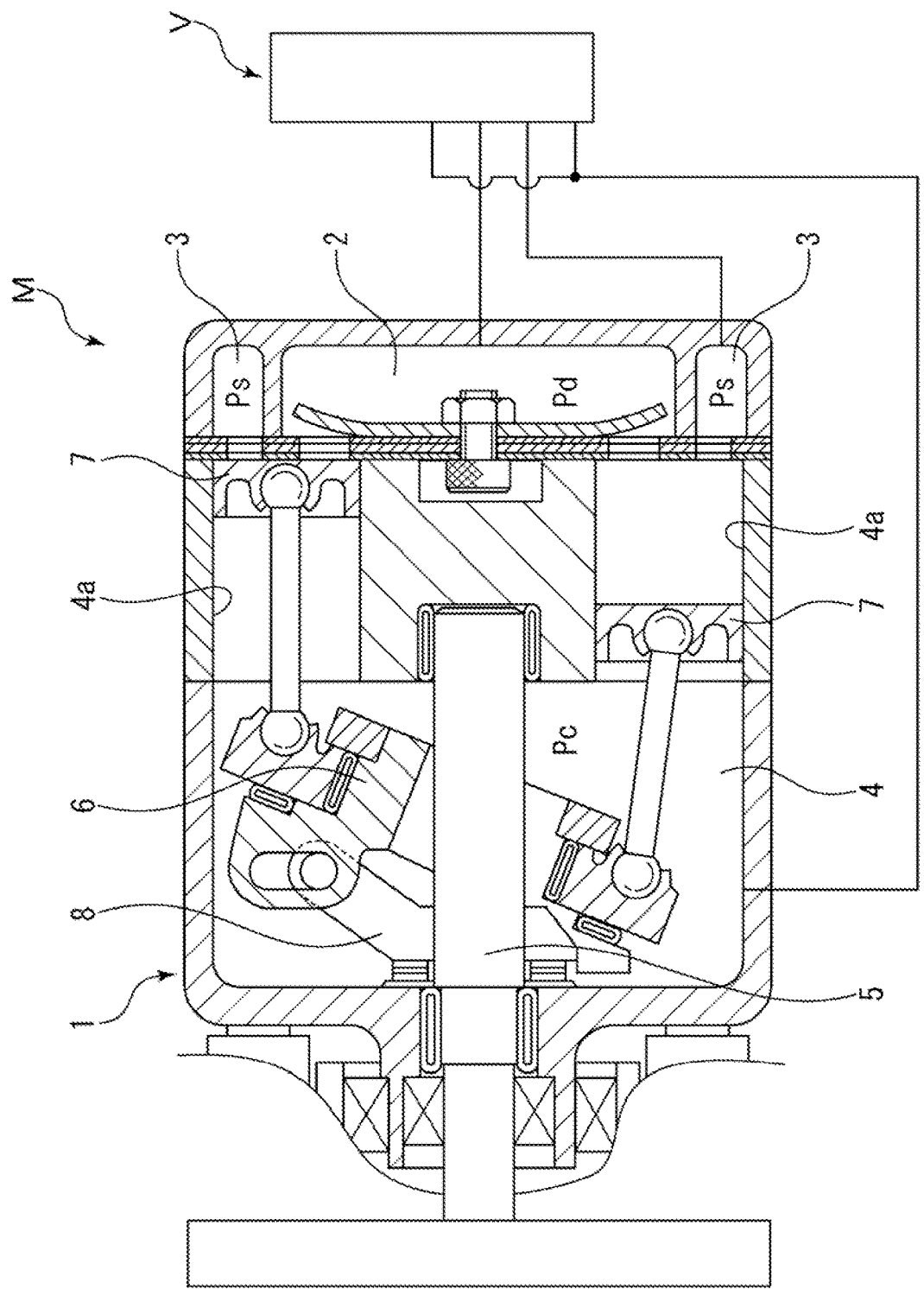
FIG. 1 is a schematic configuration view illustrating a swash plate type variable displacement compressor incorporating a capacity control valve according to an embodiment of the present invention.

First, the variable displacement compressor M will be described. As illustrated in FIG. 1, the variable displacement compressor M has a casing 1 including a discharge chamber 2, a suction chamber 3, a control chamber 4, and multiple cylinders 4a.

Moreover, the variable displacement compressor M includes a rotary shaft 5 to be rotatably driven by a not-shown engine placed outside the casing 1, a swash plate 6 coupled in an eccentric state with respect to the rotary shaft 5 by a hinge mechanism 8 in the control chamber 4, and multiple pistons 7 coupled to the swash plate 6 and each reciprocatably fitted in the cylinders 4a. Using the capacity control valve V to be openably driven by electromagnetic force, the variable displacement compressor M controls the internal pressure of the control chamber 4 as necessary to continuously change an inclination angle of the swash plate 6 while utilizing a suction pressure Ps of the suction chamber 3 for sucking the fluid, a discharge pressure Pd of the discharge chamber 2 for discharging the fluid pressurized by the piston 7, and a control pressure Pc of the control chamber 4 housing the swash plate 6. In this manner, the variable displacement compressor M changes a stroke amount of the piston 7 to control a fluid discharge amount. Note that for the sake of convenience in description, the capacity control valve V incorporated into the variable displacement compressor M is not shown in FIG. 1.

Specifically, as the control pressure Pc in the control chamber 4 increases, the inclination angle of the swash plate 6 with respect to the rotary shaft 5 decreases and the stroke amount of the piston 7 decreases. However, when such a pressure reaches a pressure of equal to or higher than a certain pressure, the swash plate 6 is brought into a state in which the swash plate 6 is substantially perpendicular to the rotary shaft 5, i.e., a state in which the swash plate 6 is slightly inclined with respect to a direction perpendicular to the rotary shaft 5. In this state, the stroke amount of the piston 7 is minimum, and pressurization of the fluid in the cylinder 4a by the piston 7 is minimum. Accordingly, the amount of fluid discharged to the discharge chamber 2 decreases, and the cooling capacity of the air-conditioning system becomes minimum. On the other hand, as the control pressure Pc in the control chamber 4 decreases, the inclination angle of the swash plate 6 with respect to the rotary shaft 5 increases and the stroke amount of the piston 7 increases. However, when such a pressure reaches a pressure of equal to or lower than a certain pressure, the swash plate 6 is at the maximum inclination angle with respect to the rotary shaft 5. In this state, the stroke amount of the piston 7 is maximum, and pressurization of the fluid in the cylinder 4a by the piston 7 is maximum. Accordingly, the amount of fluid discharged to the discharge chamber 2 increases, and the cooling capacity of the air-conditioning system becomes maximum.

Figure 2:
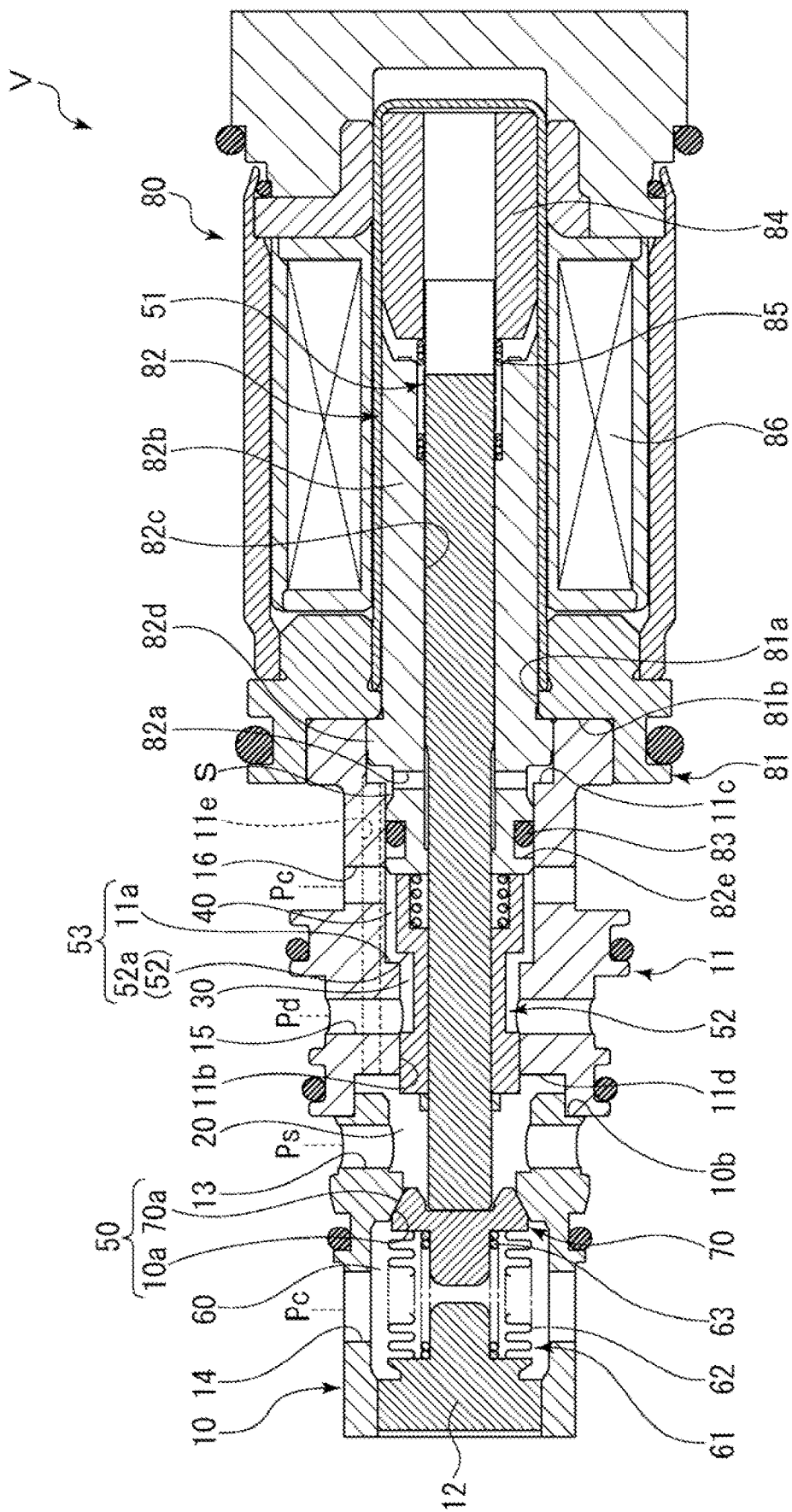
FIG. 2 is a sectional view illustrating a state in which a DC valve is opened and a CS valve is closed in a non-energization state of the capacity control valve according to the embodiment.

As illustrated in FIG. 2, the capacity control valve V incorporated into the variable displacement compressor M adjusts current energizing a coil 86 forming a solenoid 80, controls opening/closing of a CS valve 50 and a DC valve 53 in the capacity control valve V, and controls the fluid flowing into the control chamber 4 or flowing out of the control chamber 4. In this manner, the capacity control valve V variably controls the control pressure Pc in the control chamber 4. Note that upon normal control of the capacity control valve V, the discharge pressure Pd is a higher pressure than the control pressure Pc, and the control pressure Pc is a pressure of equal to or higher than the suction pressure Ps.

In the present embodiment, the CS valve 50 includes an adaptor 70 forming a pressure-sensitive body 61, and a CS valve seat 10a formed at an inner peripheral surface of a first valve housing 10 as a valve housing. A tapered end portion 70a formed on the right side of the adaptor 70 in an axial direction contacts or separates from the CS valve seat 10a, and in this manner, the CS valve 50 is opened/closed. The DC valve 53 includes a DC valve body 52 and a DC valve seat 11a formed at an inner peripheral surface of a second valve housing 11 as the valve housing. A recessed side portion 52a of the DC valve body 52 contacts or separates from the DC valve seat 11a, and in this manner, the DC valve 53 is opened/closed.

Subsequently, the structure of the capacity control valve V will be described. As illustrated in FIG. 2, the capacity control valve V mainly includes the first valve housing 10 and the second valve housing 11 made of a metal material or a resin material, a rod 51 and the DC valve body 52 arranged reciprocatably in the axial direction inside the first valve housing 10 and the second valve housing 11, the pressure-sensitive body 61 configured to provide rightward biasing force in the axial direction to the rod 51 according to the suction pressure Ps in a first valve chamber 20, and the solenoid 80 connected to the second valve housing 11 and providing drive force to the rod 51. The DC valve body 52 is fitted onto the rod 51, and is provided reciprocatably in the axial direction relative to the rod 51.

As illustrated in FIG. 2, the solenoid 80 mainly includes a casing 81 having an opening 81a opening leftward in the axial direction, a substantially cylindrical stationary iron core 82 inserted into the opening 81a of the casing 81 from the left in the axial direction and fixed to an inner diameter side of the casing 81, the rod 51 inserted into the stationary iron core 82 and arranged reciprocatably in the axial direction, a movable iron core 84 fixed to a right end portion of the rod 51 in the axial direction, a coil spring 85 provided between the stationary iron core 82 and the movable iron core 84 and biasing the movable iron core 84 rightward in the axial direction, and the excitation coil 86 wound around the outside of the stationary iron core 82 through a bobbin.

At the casing 81, a recessed portion 81b recessed rightward in the axial direction on the inner diameter side at a left end in the axial direction is formed. A right end portion of the second valve housing 11 in the axial direction is substantially hermetically inserted/fixed into the recessed portion 81b.

The stationary iron core 82 is made of a rigid body as a magnetic material such as iron or silicon steel, and includes a cylindrical portion 82b extending in the axial direction and formed with an insertion hole 82c into which a right portion of the rod 51 in the axial direction is inserted and an annular flange portion 82d extending in an outer diameter direction from an outer peripheral surface of a left end portion of the cylindrical portion 82b in the axial direction. On the left side in the axial direction with respect to the flange portion 82d, an annular recessed portion 82e recessed in an inner diameter direction from an outer peripheral surface of the cylindrical portion 82b is formed. Note that an O-ring 83 is attached to the annular recessed portion 82e, and therefore, the stationary iron core 82 and the second valve housing 11 are connected and fixed to each other in a hermetic state.

Moreover, in a state in which a right end surface of the flange portion 82d in the axial direction contacts a bottom surface of the recessed portion 81b of the casing 81, the stationary iron core 82 is inserted/fixed into a recessed portion 11c recessed leftward in the axial direction on the inner diameter side at a right end, which is inserted/fixed into the recessed portion 81b of the casing 81, of the second valve housing 11 in the axial direction.

Further, in a state in which the stationary iron core 82 and the second valve housing 11 are attached to the casing 81, an annular space S is formed between a left end surface of the flange portion 82d of the stationary iron core 82 in the axial direction and the recessed portion 11c of the second valve housing 11. Note that the space S is communicated with the insertion hole 82c inside the stationary iron core 82 through a through-hole 82a extending in a radial direction between the flange portion 82d and the annular recessed portion 82e at the cylindrical portion 82b of the stationary iron core 82.

As illustrated in FIG. 2, a Ps port 13 as a suction port communicated with the suction chamber 3 of the variable displacement compressor M and a first Pc port 14 as a first control port communicated with the control chamber 4 of the variable displacement compressor M are formed at the first valve housing 10. Moreover, a Pd port 15 as a discharge port communicated with the discharge chamber 2 of the variable displacement compressor M and a second Pc port 16 as a second control port communicated with the control chamber 4 of the variable displacement compressor M are formed at the second valve housing 11. Note that these ports are, from a solenoid 80 side, formed in the order of the second Pc port 16, the Pd port 15, the Ps port 13, and the first Pc port 14.

Moreover, an outer diameter portion at a right end of the first valve housing 10 in the axial direction is recessed leftward in the axial direction to form a step portion 10b, and a left end portion of the second valve housing 11 in the axial direction is fitted onto such an outer diameter portion from the right in the axial direction such that the first valve housing 10 is connected and fixed in a hermetic state. Further, a partition adjustment member 12 is substantially hermetically press-fitted in a left end portion of the first valve housing 10 in the axial direction, and therefore, the first valve housing 10 is in a substantially cylindrical shape with a bottom. Note that the partition adjustment member 12 adjusts an installation position of the first valve housing 10 in the axial direction so that the biasing force of the pressure-sensitive body 61 can be adjusted.

The rod 51 and the DC valve body 52 are arranged reciprocatably in the axial direction in the first valve housing 10 and the second valve housing 11, and at part of the inner peripheral surface of the second valve housing 11, a small-diameter guide surface 11b is formed so that an outer peripheral surface of a third cylindrical portion 52d (see FIGS. 3 to 5) of the DC valve body 52 can slidably contact the guide surface 11b in a substantially hermetic state.

Moreover, in the first valve housing 10, the first valve chamber 20 which is communicated with the Ps port 13 and in which a left end portion of the rod 51 in the axial direction is arranged and a pressure-sensitive chamber 60 which is communicated with the first Pc port 14 and in which the pressure-sensitive body 61 is arranged are formed. Further, in the second valve housing 11, a second valve chamber 30 which is communicated with the Pd port 15 and in which a second cylindrical portion 52c (see FIGS. 3 to 5) of the DC valve body 52 is arranged and a third valve chamber 40 which is communicated with the second Pc port 16 and is arranged on the solenoid 80 side of the second valve housing 11 are formed.

Note that the first valve chamber 20 is defined by outer peripheral surfaces at left end portions of the rod 51 and the DC valve body 52 in the axial direction, an inner peripheral surface on the right side in the axial direction with respect to the CS valve seat 10a of the first valve housing 10, and an inner surface of a recessed portion 11d recessed rightward in the axial direction on the inner diameter side at a left end of the second valve housing 11 in the axial direction. Further, in a state in which the first valve housing 10 and the second valve housing 11 are connected and fixed to each other, the first valve chamber 20 and the second valve chamber 30 are partitioned by the third cylindrical portion 52d of the DC valve body 52. Moreover, the second valve chamber 30 and the third valve chamber 40 are defined by an outer peripheral surface of the DC valve body 52 and the inner peripheral surface of the second valve housing 11.

When the DC valve 53 is closed, the second valve chamber 30 and the third valve chamber 40 are separated from each other. When the DC valve 53 is opened, the second valve chamber 30 and the third valve chamber 40 are communicated with each other.

Further, a through-hole 11e extending in the axial direction from the recessed portion 11c on the right side in the axial direction to the recessed portion 11d on the left side in the axial direction is formed at the second valve housing 11, and the first valve chamber 20 and the space S are communicated with each other through the through-hole 11e. Thus, the suction pressure Ps of the suction chamber 3 is introduced into the right side in the axial direction as the back side of the movable iron core 84 forming the solenoid 80 through the Ps port 13, the first valve chamber 20, the through-hole 11e of the second valve housing 11, the space S, and the through-hole 82a and the insertion hole 82c of the stationary iron core 82, and accordingly, pressure on both sides of the rod 51 in the axial direction is balanced.

As illustrated in FIG. 2, the pressure-sensitive body 61 mainly includes a bellows core 62 having a built-in coil spring 63, and the adaptor 70 provided at a right end of the bellows core 62 in the axial direction. A left end of the bellows core 62 in the axial direction is fixed to the partition adjustment member 12.

Moreover, the pressure-sensitive body 61 is arranged in the pressure-sensitive chamber 60, and by the biasing force of moving the adaptor 70 rightward in the axial direction by the coil spring 63 and the bellows core 62, the tapered end portion 70a of the adaptor 70 sits on the CS valve seat 10a of the first valve housing 10.

Figure 3:
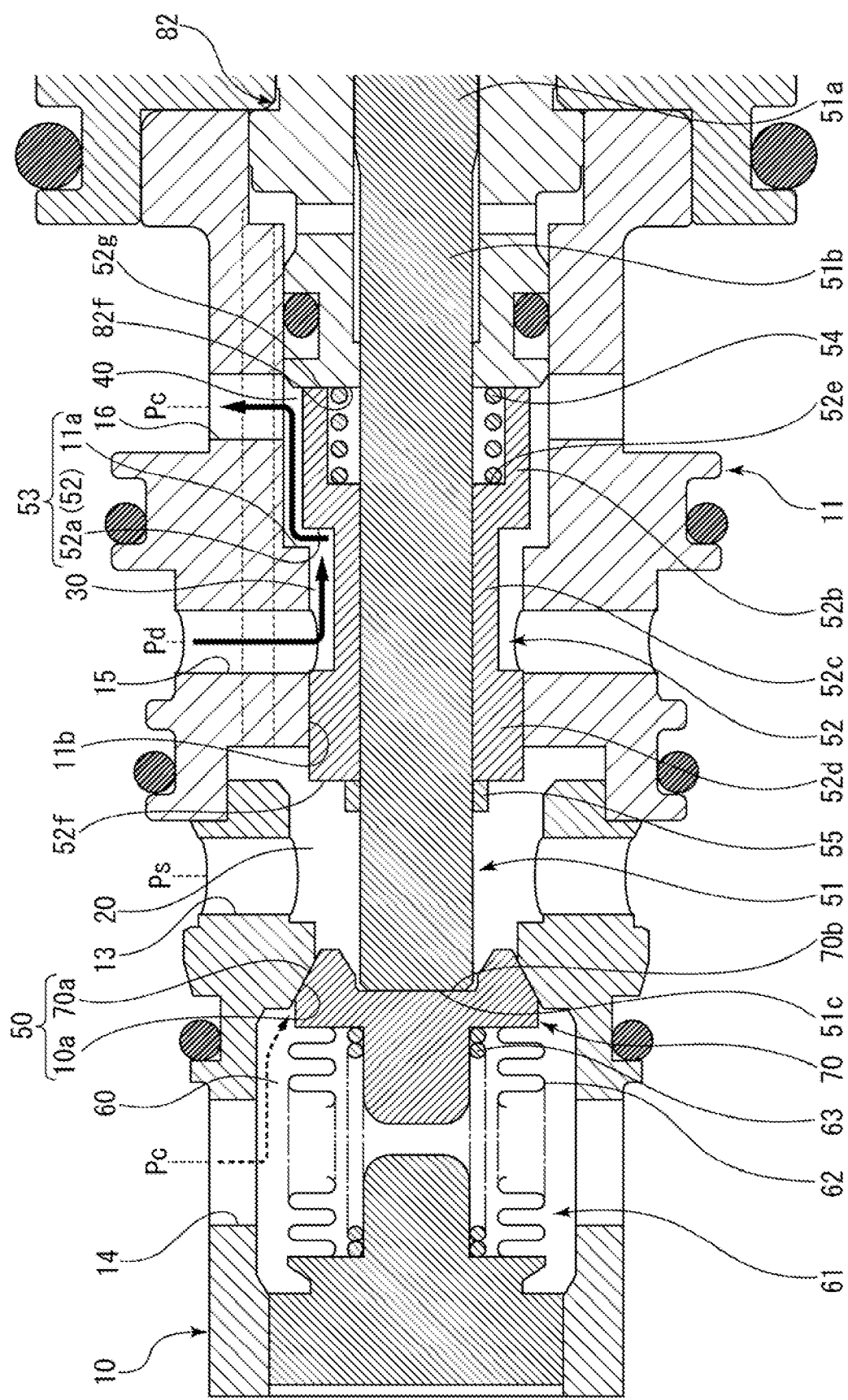
FIG. 3 is an enlarged sectional view of FIG. 2 illustrating a state in which the DC valve is opened and the CS valve is closed in the non-energization state of the capacity control valve according to the embodiment.
Figure 4:
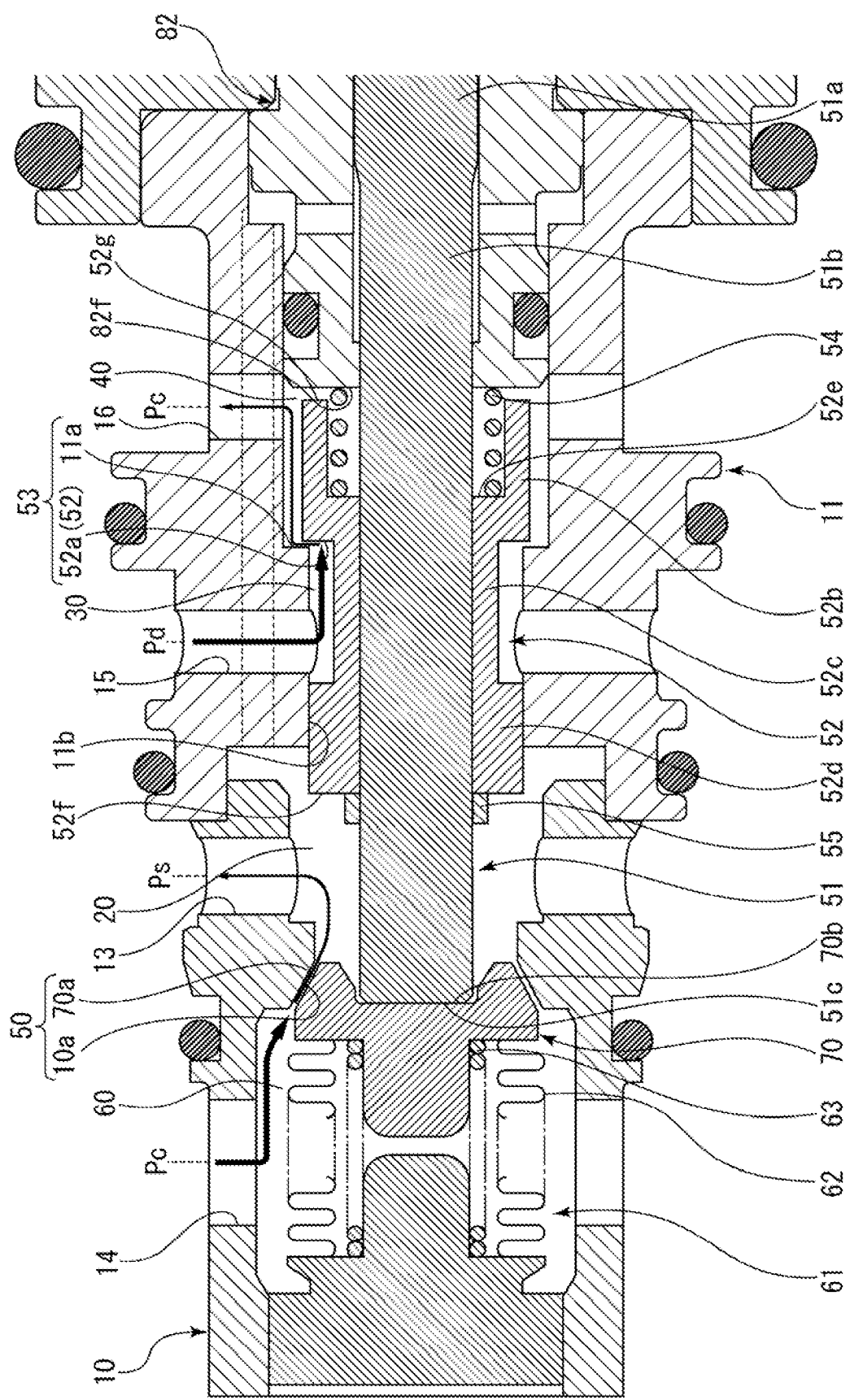
FIG. 4 is a sectional view illustrating a state in which the degrees of opening of the DC valve and the CS valve are adjusted in an energization state (e.g., in normal control) of the capacity control valve according to the embodiment.
Figure 5:
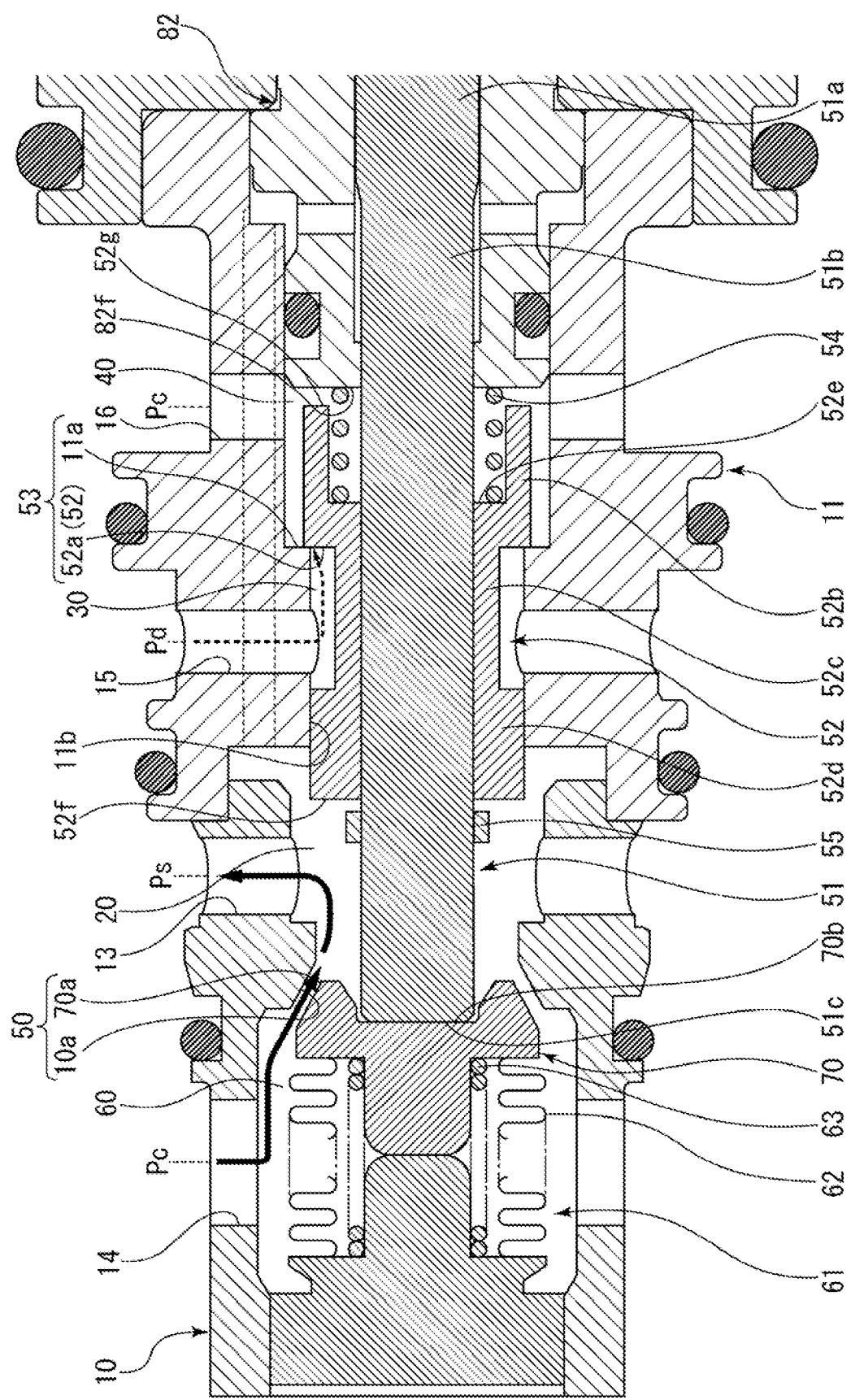
FIG. 5 is a sectional view illustrating a state in which the DC valve is closed and the CS valve is opened in the energization state (e.g., in a maximum current state) of the capacity control valve according to the embodiment.

As illustrated in FIGS. 3 to 5, the rod 51 includes a large-diameter portion 51a fixed to the movable iron core 84 (see FIG. 2) at a right end portion in the axial direction, and a small-diameter portion 51b formed with a smaller diameter than that of the large-diameter portion 51a on the left side of the large-diameter portion 51a in the axial direction. The DC valve body 52 and a coil spring 54 as a spring are inserted into the small-diameter portion 51b from the left side in the axial direction. Note that a ring 55 as another body is fixed to a left end portion of the small-diameter portion 51b in the axial direction in a state in which the ring 55 is fitted onto such a left end portion.

Moreover, a left end 51c of the rod 51 in the axial direction, i.e., the left end 51c of the small-diameter portion 51b in the axial direction, contacts a bottom surface of a recessed portion 70b recessed leftward in the axial direction on the inner diameter side at a right end of the adaptor 70, which forms the pressure-sensitive body 61, in the axial direction. Accordingly, the leftward drive force of the solenoid 80 in the axial direction acts on the pressure-sensitive body 61, and rightward reactive force in the axial direction is received from the pressure-sensitive body 61.

Subsequently, the DC valve body 52 will be described. As illustrated in FIGS. 3 to 5, the DC valve body 52 is formed in a stepped cylindrical shape having a first cylindrical portion 52b arranged in the second valve chamber 30 and the third valve chamber 40 and formed with the recessed side portion 52a on the left side in the axial direction, the second cylindrical portion 52c formed with a smaller diameter than that of the first cylindrical portion 52b on the left side in the axial direction with respect to the first cylindrical portion 52b, and the third cylindrical portion 52d formed with a larger diameter than that of the second cylindrical portion 52c on the left side in the axial direction with respect to the second cylindrical portion 52c and having the outer peripheral surface slidably contacting the guide surface 11b of the second valve housing 11. The DC valve body 52 is, together with the coil spring 54, fitted onto the small-diameter portion 51b of the rod 51. Note that an inner peripheral surface of the DC valve body 52 and an outer peripheral surface of the small-diameter portion 51b of the rod 51 are separated from each other in the radial direction to form a clearance therebetween, and the DC valve body 52 is smoothly slidable in the axial direction relative to the rod 51.

Moreover, a recessed portion 52e recessed leftward in the axial direction on the inner diameter side at a right end of the first cylindrical portion 52b in the axial direction is formed at the DC valve body 52. Thus, the inside of the DC valve body 52 is in a stepped cylindrical shape, and the coil spring 54 as a compression spring is arranged in the recessed portion 52e.

Further, a left end of the coil spring 54 in the axial direction contacts a bottom surface of the recessed portion 52e of the first cylindrical portion 52b of the DC valve body 52, and a right end of the coil spring 54 in the axial direction contacts a left end surface 82f of the stationary iron core 82 in the axial direction. That is, the DC valve body 52 is biased leftward in the axial direction by the coil spring 54. When the DC valve 53 is opened, the DC valve body 52 is brought into a state in which a left end 52f of the DC valve body 52 in the axial direction is pressed against a right end surface of the ring 55 in the axial direction (see FIGS. 3 and 4), and together with the rod 51, moves rightward in the axial direction, i.e., an opening direction. When the DC valve 53 is closed, the DC valve body 52 is brought into a state in which the recessed side portion 52a of the DC valve body 52 is pressed against the DC valve seat 11a of the second valve housing 11 (see FIG. 5), and can reliably hold a closed state of the DC valve 53. Further, the rod 51 is movable leftward in the axial direction relative to the DC valve body 52 after closing of the DC valve 53, and therefore, the degree of opening of the CS valve 50 can be further increased after closing of the DC valve 53 (see FIG. 5).

Subsequently, operation of the capacity control valve V and operation of opening/closing mechanisms of the CS valve 50 and the DC valve 53 by movement of the rod 51 and the DC valve body 52 in the axial direction will be described.

First, a non-energization state of the capacity control valve V will be described. As illustrated in FIGS. 2 and 3, in the capacity control valve V, a biasing force (referred to as $F_{sp1}$) of the coil spring 85 forming the solenoid 80 and a biasing force (referred to as $F_{be1}$) of the pressure-sensitive body 61 (formed by the bellows core 62 and the coil spring 63) acts rightward in the axial direction on the rod 51 in the non-energization state, and a biasing force (referred to as $F_{sp2}$) of the coil spring 54 acting on the DC valve body 52 acts leftward in the axial direction on the rod 51 in the non-energization state (i.e., force $F_{rod}=F_{sp1}+F_{be1}-F_{sp2}$ acts on the rod 51, supposing that the rightward direction is a positive direction). Thus, the tapered end portion 70a of the adaptor 70 forming the pressure-sensitive body 61 sits on the CS valve seat 10a of the first valve housing 10, the CS valve 50 is closed (e.g., fully closed), the DC valve body 52 moves rightward in the axial direction, i.e., the opening direction, together with the rod 51, and a right end 52g of the DC valve body 52 in the axial direction contacts the left end surface 82f of the stationary iron core 82 in the axial direction. Moreover, the recessed side portion 52a of the DC valve body 52 is separated from the DC valve seat 11a of the second valve housing 11, and the DC valve 53 is opened.

As described above, when the solenoid 80 is not energized, the CS valve 50 is closed (e.g., fully closed), and the DC valve 53 is opened. In a state in which the CS valve 50 is closed, the opening area of the DC valve 53, i.e., the degree of opening of the valve, is maximum (see FIGS. 6 and 7).

Next, an energization state of the capacity control valve V will be described. As illustrated in FIGS. 4 and 5, when an electromagnetic force (referred to as $F_{sol}$) generated by current application to the solenoid 80 exceeds the force $F_{rod}$ in the energization state in the capacity control valve V, the movable iron core 84 is attracted to a stationary iron core 82 side, i.e., the left side in the axial direction, against the biasing force of the coil spring 85 forming the solenoid 80, the rod 51 fixed to the movable iron core 84 moves leftward in the axial direction, and the pressure-sensitive body 61 is pressed leftward in the axial direction by the left end 51c of the rod 51 in the axial direction and is contracted. Thus, the tapered end portion 70a of the adaptor 70 is separated from the CS valve seat 10a of the first valve housing 10, and the CS valve 50 is opened. Moreover, the DC valve body 52 is biased leftward in the axial direction by the coil spring 54, and is held in a state in which the left end 52f of the DC valve body 52 in the axial direction is pressed against the right end surface of the ring 55 in the axial direction. Thus, the DC valve body 52 moves leftward in the axial direction together with the rod 51.

In normal control (so-called duty control) of the capacity control valve V as illustrated in FIG. 4, control with a lower energization current than the maximum current for the solenoid 80 causes the CS valve 50 to transition from a closed state (e.g., a fully-closed state) to an open state, and causes the DC valve 53 to transition from an open state (e.g., a fully-open state) to the closed state. According to such a configuration, in the normal control of the capacity control valve V, a refrigerant flow rate is controlled by cooperation of the CS valve 50 and the DC valve 53 so that the control pressure Pc can be efficiently controlled. Further, as a current value, i.e., the stroke of the rod 51, increases, the opening area of the CS valve 50 increases and the opening area of the DC valve 53 decreases (see FIGS. 6 and 7). That is, the degree of opening of the CS valve 50 and the degree of opening of the DC valve 53 transition in opposite directions as energization current for the solenoid 80 increases, and therefore, the control pressure Pc can be quickly controlled.

Figure 6:
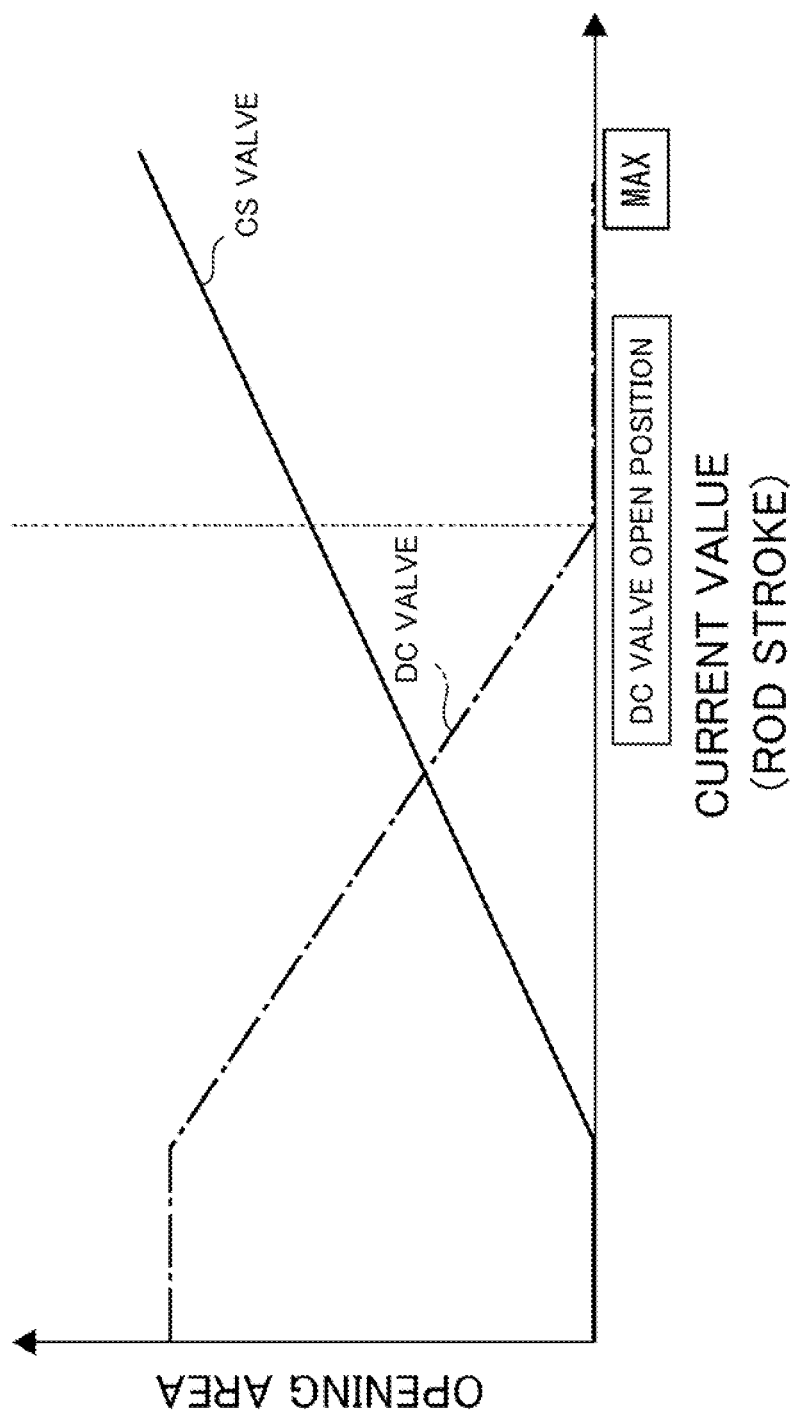
FIG. 6 is a view for describing the opened/closed state of the DC valve and the opened/closed state of the CS valve in association with energization current (corresponding to a rod stroke) in the capacity control valve according to the embodiment. Note that the energization current (corresponding to the stroke) of the horizontal axis is shown in terms of the direction (i.e., a direction from the left to the right in FIG. 2) of moving a rod upon current application to a solenoid.

Moreover, it is configured such that the DC valve 53 is closed (e.g., fully closed) with a stroke of equal to or longer than a predetermined stroke shorter than the maximum stroke of the rod 51 with the maximum current for the solenoid 80 as illustrated in FIG. 5, i.e., closed (e.g., fully closed) at a closed position of the DC valve 53 in FIG. 6. Thus, a control range of the control pressure Pc by the CS valve 50 according to the energization current for the solenoid 80 is broader than a control range of the control pressure Pc by the DC valve 53. While the CS valve 50 is transitioning from the closed state to the open state (the opening area proportionally changes according to the stroke of the rod 51), the DC valve 53 is opened when the stroke of the rod 51 is equal to or shorter than a predetermined stroke, and is closed (e.g., fully closed) when such a stroke is equal to or longer than the predetermined stroke. In other words, closing is continued even when the current value is increased after closing of the DC valve 53. That is, control of the refrigerant flow rate from the first Pc port 14 to the Ps port 13 by the CS valve 50 with a smaller required refrigerant flow rate is main, and control of the refrigerant flow rate from the Pd port 15 to the second Pc port 16 by the DC valve 53 with a greater required refrigerant flow rate is auxiliary. Thus, an internal circulating refrigerant flow rate in the normal control of the capacity control valve V can be reduced, and a favorable efficiency for controlling the control pressure Pc is provided. Consequently, an operation efficiency of the variable displacement compressor M can be enhanced.

Further, the CS valve 50 is arranged in the pressure-sensitive chamber 60 formed with the first Pc port 14, and includes the pressure-sensitive body 61 configured to bias the rod 51 rightward in the axial direction and the CS valve seat 10a provided at the first valve housing 10. Thus, a structure in which the reactive force provided to the rod 51 according to the suction pressure Ps of the first valve chamber 20 is increased/decreased is made, and controllability of the control pressure Pc is enhanced.

In addition, the DC valve 53 includes the DC valve body 52 slidably fitted onto the rod 51 and the DC valve seat 11a formed at the inner peripheral surface of the second valve housing 11, and therefore, can be simply configured.

Moreover, the DC valve body 52 is biased leftward in the axial direction, i.e., toward a DC valve seat 11a side, by the coil spring 54, and therefore, the closed state can be reliably held upon closing of the DC valve 53. Further, the DC valve body 52 slides, at the inner peripheral surface thereof, on the outer peripheral surface of the small-diameter portion 51b of the rod 51, and the outer peripheral surface of the third cylindrical portion 52d and the guide surface 11b of the second valve housing 11 slide on each other. Thus, relative movement of the DC valve body 52 and the rod 51 in the axial direction can be stabilized.

In addition, in a state in which the first valve housing 10 and the second valve housing 11 are connected and fixed to each other, the first valve chamber 20 communicated with the Ps port 13 and the second valve chamber 30 communicated with the Pd port 15 are partitioned by the third cylindrical portion 52d of the DC valve body 52, and therefore, the capacity control valve V can be simply configured.

Moreover, the ring 55 as another body is fixed to the small-diameter portion 51b of the rod 51, and therefore, rightward movement of the DC valve body 52 in the axial direction, i.e., movement in a closing direction, is restricted. Thus, the closed state of the DC valve 53 can be reliably held. Consequently, it is not necessary to form, e.g., a flange portion at the rod 51, and the configuration of the rod 51 can be simplified.

The embodiment of the present invention has been described above with reference to the drawings, but specific configurations are not limited to such an embodiment. Even changes and additions made without departing from the gist of the present invention are included in the present invention.

For example, the timing of closing the DC valve 53 by the stroke of the rod 51 may be adjusted as necessary in such a manner that arrangement of the DC valve body 52 with respect to the rod 51 in the axial direction, a formation position of the DC valve seat 11a in the axial direction at the second valve housing 11, or the dimensions or shape of the DC valve body 52 is changed.

Moreover, the form in which the ring 55 as another body is fixed to the small-diameter portion 51b of the rod 51 to restrict rightward movement of the DC valve body 52 in the axial direction, i.e., movement in the closing direction, has been described. However, a portion targeted for restriction is not limited to a ring shape, and may be a C-shape, for example. Further, the portion targeted for restriction may be formed integrally with the rod.

In addition, the coil spring 54 is not limited to the compression spring, and may be a tension spring or may be in other shapes than a coil shape.

Moreover, the first valve housing 10 and the second valve housing 11 may be integrally formed.

Figure 8:
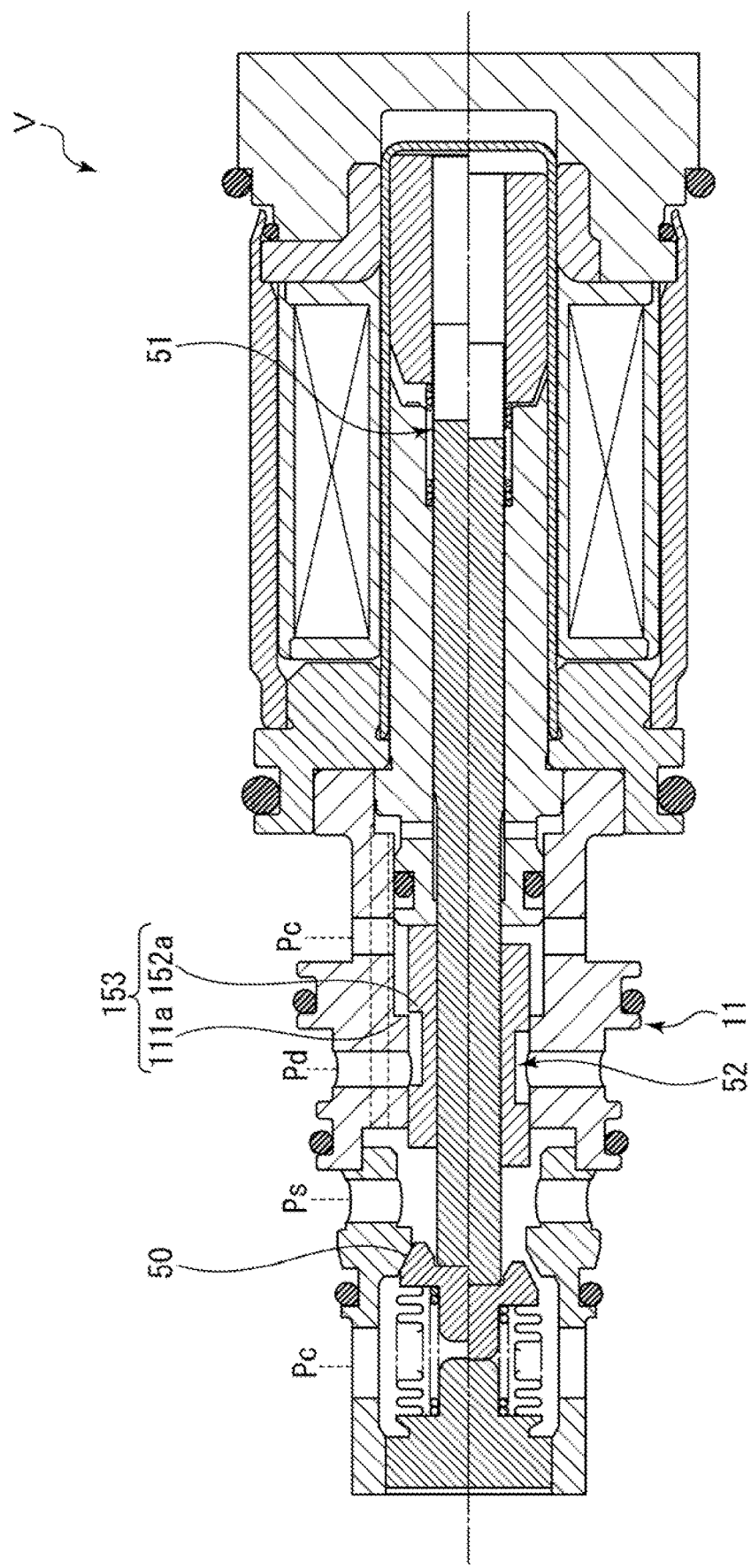
FIG. 8 is a sectional view illustrating a variation of the capacity control valve according to the present invention, an upper view illustrating a state in which a DC valve is opened and a CS valve is closed in a non-energization state and a lower view illustrating a state in which the DC valve is closed and the CS valve is opened in an energization state (e.g., a maximum current state) of the capacity control valve.

Further, the example where the DC valve 53 is formed using the DC valve body 52 movable relative to the rod 51 has been described, but other configurations may be employed. For example, in a spool valve structure illustrated in FIG. 8, the CS valve 50 may have the same structure as that of the embodiment, a DC valve body 152 may be fixed to the rod 51, and a DC valve 153 of the spool valve structure may be formed by a land portion 152a of the DC valve body 152 and an inner peripheral portion 111a of the second valve housing 11. In this case, the rod and the DC valve body may be integrally formed.

In addition, the pressure-sensitive body 61 does not necessarily use the coil spring therein.

REFERENCE SIGNS LIST

1 Casing
2 Discharge chamber
3 Suction chamber
4 Control chamber
10 First valve housing (valve housing)
10a CS valve seat
11 Second valve housing (valve housing)
11a DC valve seat
11b Guide surface
12 Partition adjustment member
13 Ps port (suction port)
14 First Pc port (first control port)
15 Pd port (discharge port)
16 Second Pc port (second control port)
20 First valve chamber
30 Second valve chamber
40 Third valve chamber
50 CS valve
51 Rod
52 DC valve body
52a Recessed side portion
52b First cylindrical portion
52c Second cylindrical portion
52d Third cylindrical portion
52e Recessed portion
52f Left end in axial direction
52g Right end in axial direction
53 DC valve
54 Coil spring (spring)
55 Ring
60 Pressure-sensitive chamber
61 Pressure-sensitive body
62 Bellows core
63 Coil spring
70 Adaptor
70a Tapered end portion
70b Recessed portion
80 Solenoid
82 Stationary iron core
83 O-ring
84 Movable iron core
85 Coil spring
Pc Control pressure
Pd Discharge pressure
Ps Suction pressure
V Capacity control valve

The invention claimed is:

1. A capacity control valve for controlling a flow rate by energization of a solenoid, comprising:
    a valve housing formed with a discharge port through which discharge fluid with a discharge pressure passes, a suction port through which suction fluid with a suction pressure passes, and first and second control ports through which control fluid with a control pressure passes;
    a rod arranged in the valve housing and driven by the solenoid;
    a CS valve configured to control a fluid flow between the first control port and the suction port in accordance with a movement of the rod; and
    a DC valve configured to control a fluid flow between the second control port and the discharge port in accordance with a movement of the rod,
    wherein in a non-energization state of the solenoid, the CS valve is closed and the DC valve is opened,
    wherein in a maximum current state of the solenoid, the CS valve is opened and the DC valve is closed,
    wherein in energization control of the solenoid, the CS valve transitions from a closed state to an open state and the DC valve transitions from an open state to a closed state, and the DC valve is closed with a stroke of equal to or longer than a predetermined stroke shorter than a maximum stroke of the rod,
    wherein the DC valve includes a DC valve body slidably attached to the rod and a DC valve seat formed in the valve housing, and
    wherein the DC valve body is biased toward a side of the DC valve seat by a spring.

2. The capacity control valve according to claim 1, wherein
    a flange portion extending in a radially outward direction and configured to restrict movement of the DC valve body in a closing direction of the DC valve is provided in the rod.

3. The capacity control valve according to claim 2, wherein
    the flange portion is formed by a ring which is a body different from a rod body.

4. The capacity control valve according to claim 3, wherein
    the DC valve body is arranged between an outer periphery of the rod and an inner periphery of the valve housing so as to partition the suction port and the discharge port.

5. The capacity control valve according to claim 2, wherein
    the DC valve body is arranged between an outer periphery of the rod and an inner periphery of the valve housing so as to partition the suction port and the discharge port.

6. The capacity control valve according to claim 1, wherein
    the DC valve body is arranged between an outer periphery of the rod and an inner periphery of the valve housing so as to partition the suction port and the discharge port.

7. The capacity control valve according to claim 1, wherein
    the CS valve includes a CS valve seat formed in the valve housing and a pressure-sensitive body arranged in a pressure-sensitive chamber formed with the first control port and configured to bias the rod.

8. The capacity control valve according to claim 1, wherein
    the second control port, the discharge port, the suction port, and the first control port are arranged in a description order from a side of the solenoid.

9. A capacity control valve for controlling a flow rate by energization of a solenoid, comprising:
    a valve housing formed with a discharge port through which discharge fluid with a discharge pressure passes, a suction port through which suction fluid with a suction pressure passes, and first and second control ports through which control fluid with a control pressure passes;
    a rod arranged in the valve housing and driven by the solenoid;
    a CS valve configured to control a fluid flow between the first control port and the suction port in accordance with a movement of the rod; and
    a DC valve configured to control a fluid flow between the second control port and the discharge port in accordance with a movement of the rod,
    wherein in a non-energization state of the solenoid, the CS valve is closed and the DC valve is opened,
    wherein in a maximum current state of the solenoid, the CS valve is opened and the DC valve is closed, and
    wherein in energization control of the solenoid, the CS valve transitions from a closed state to an open state and the DC valve transitions from an open state to a closed state, and the DC valve is closed with a stroke of equal to or longer than a predetermined stroke shorter than a maximum stroke of the rod,
    wherein the DC valve includes a DC valve body slidably attached to the rod and a DC valve seat formed in the valve housing, and
    wherein a flange portion extending in a radially outward direction and configured to restrict movement of the DC valve body in a closing direction of the DC valve is provided in the rod.

10. The capacity control valve according to claim 9, wherein
    the DC valve body is biased toward a side of the DC valve seat by a spring.

11. The capacity control valve according to claim 9, wherein
    the flange portion is formed by a ring which is a body different from a rod body.

12. The capacity control valve according to claim 9, wherein
    the DC valve body is arranged between an outer periphery of the rod and an inner periphery of the valve housing so as to partition the suction port and the discharge port.

13. The capacity control valve according to claim 9, wherein
    the CS valve includes a CS valve seat formed in the valve housing and a pressure-sensitive body arranged in a pressure-sensitive chamber formed with the first control port and configured to bias the rod.

14. The capacity control valve according to claim 9, wherein
    the second control port, the discharge port, the suction port, and the first control port are arranged in a description order from a side of the solenoid.

15. A capacity control valve for controlling a flow rate by energization of a solenoid, comprising:
    a valve housing formed with a discharge port through which discharge fluid with a discharge pressure passes, a suction port through which suction fluid with a suction pressure passes, and first and second control ports through which control fluid with a control pressure passes;
a rod arranged in the valve housing and driven by the solenoid;
a CS valve configured to control a fluid flow between the first control port and the suction port in accordance with a movement of the rod; and
a DC valve configured to control a fluid flow between the second control port and the discharge port in accordance with a movement of the rod,
wherein in a non-energization state of the solenoid, the CS valve is closed and the DC valve is opened,
wherein in a maximum current state of the solenoid, the CS valve is opened and the DC valve is closed, and
wherein in energization control of the solenoid, the CS valve transitions from a closed state to an open state and the DC valve transitions from an open state to a closed state, and the DC valve is closed with a stroke of equal to or longer than a predetermined stroke shorter than a maximum stroke of the rod,
wherein the DC valve includes a DC valve body slidably attached to the rod and a DC valve seat formed in the valve housing, and
wherein the DC valve body is arranged between an outer periphery of the rod and an inner periphery of the valve housing so as to partition the suction port and the discharge port.

16. The capacity control valve according to claim 15, wherein
the DC valve body is biased toward a side of the DC valve seat by a spring.

17. The capacity control valve according to claim 15, wherein
a flange portion extending in a radially outward direction and configured to restrict movement of the DC valve body in a closing direction of the DC valve is provided in the rod.

18. The capacity control valve according to claim 17, wherein
the flange portion is formed by a ring which is a body different from a rod body.

19. The capacity control valve according to claim 15, wherein
the CS valve includes a CS valve seat formed in the valve housing and a pressure-sensitive body arranged in a pressure-sensitive chamber formed with the first control port and configured to bias the rod.

20. The capacity control valve according to claim 15, wherein
the second control port, the discharge port, the suction port, and the first control port are arranged in a description order from a side of the solenoid.

* * * * *